US009651162B2

(12) United States Patent
Hirai

(10) Patent No.: US 9,651,162 B2
(45) Date of Patent: May 16, 2017

(54) RELIEF VALVE

(71) Applicant: Surpass Industry Co., Ltd., Saitama (JP)

(72) Inventor: Kazuki Hirai, Saitama (JP)

(73) Assignee: SURPASS INDUSTRY CO., LTD. (JP)

( * ) Notice: Subject to any disclaimer, the term of this patent is extended or adjusted under 35 U.S.C. 154(b) by 0 days.

(21) Appl. No.: 14/486,250

(22) Filed: Sep. 15, 2014

(65) Prior Publication Data

US 2015/0083242 A1 Mar. 26, 2015

(30) Foreign Application Priority Data

Sep. 20, 2013 (JP) ................................. 2013-195399

(51) Int. Cl.
*F16K 31/12* (2006.01)
*F16K 17/04* (2006.01)
*F16K 27/02* (2006.01)

(52) U.S. Cl.
CPC ...... *F16K 17/0433* (2013.01); *F16K 17/0466* (2013.01); *F16K 27/0209* (2013.01); *Y10T 137/7835* (2015.04); *Y10T 137/7929* (2015.04)

(58) Field of Classification Search
CPC ......... Y10T 137/7781; Y10T 137/7835; Y10T 137/7836; Y10T 137/7922; Y10T 137/7929
See application file for complete search history.

(56) References Cited

U.S. PATENT DOCUMENTS

| | | | | |
|---|---|---|---|---|
| 3,867,956 A | * | 2/1975 | Ibragimov | .............. F16K 17/06 |
| | | | | 137/269 |
| 3,945,607 A | | 3/1976 | Dashner | |
| 4,327,767 A | * | 5/1982 | Fehrenbach | ....... G05D 16/0666 |
| | | | | 137/510 |
| 4,877,048 A | * | 10/1989 | Oltean | .................. B60C 23/003 |
| | | | | 137/225 |

(Continued)

FOREIGN PATENT DOCUMENTS

| | | |
|---|---|---|
| FR | 2 410 773 | 6/1979 |
| GB | 176 037 | 2/1922 |

(Continued)

OTHER PUBLICATIONS

European Search Report issued in European Patent Application No. 14184850.7 dated Feb. 18, 2015, pp. 1-7.

*Primary Examiner* — R. K. Arundale
(74) *Attorney, Agent, or Firm* — MH2 Technology Law Group LLP

(57) ABSTRACT

In the relief valve, an annular convex portion 16a that is convexed in a direction in which a valve element 5a moves away from a valve hole 17 along a center axis of the valve hole 17 and that is arranged around the valve hole 17 is formed in a valve chamber 16, an annular concave portion 5d that is concaved in the direction in which the valve element 5a moves away from the valve hole 17 is formed in the valve element 5a, and in a shut-off state, the annular convex portion 16a is accommodated in the annular concave portion 5d, and an annular channel 19 that extends in a direction of the center axis is formed between an outer peripheral surface 16b of the annular convex portion 16a and an inner peripheral surface 5e of the annular concave portion 5d.

3 Claims, 5 Drawing Sheets

(56) References Cited

U.S. PATENT DOCUMENTS

| | | | |
|---|---|---|---|
| 6,481,418 B1 * | 11/2002 | Ristich | F02M 69/54 |
| | | | 123/457 |
| 6,874,531 B2 | 4/2005 | Igarashi | |
| 8,413,955 B1 | 4/2013 | Rooney | |
| 2003/0102031 A1 | 6/2003 | Igarashi | |

FOREIGN PATENT DOCUMENTS

| | | |
|---|---|---|
| GB | 1 242 036 | 8/1971 |
| JP | 2003-166659 | 6/2003 |

* cited by examiner

RELIEF VALVE

CROSS-REFERENCE TO RELATED APPLICATIONS

This application is based on Japanese Patent Application No. 2013-195399, the contents of which are incorporated herein by reference in its entirety.

TECHNICAL FIELD

The present invention relates to a relief valve,

BACKGROUND ART

Conventionally, a relief valve is known which comes into an open state when the fluid pressure of a fluid flowing in from an inflow channel exceeds a given pressure, and thereby allows passage of the fluid (for example, see PTL 1). A relief valve disclosed in PTL 1 includes a valve hole, into which a valve element is inserted, and a valve chamber that accommodates the valve element. An urging force in a direction to bring the valve element into contact with the valve hole is also applied to the valve element from a spring.

The relief valve disclosed in PTL 1 comes into a closed state in which the valve element is in contact with the valve hole when a fluid pressure on an inflow channel side (a primary side) is lower than a given pressure. On the other hand, when the fluid pressure on the inflow channel side reaches the given pressure or more, the fluid pressure of the fluid in the vicinity of the valve hole acts to apply a force overcoming the urging force from the spring to the valve element. The valve element moves away from the valve hole to cause the fluid in the inflow channel to flow into the valve chamber through the valve hole. The fluid farther flows out to an outflow channel front the valve chamber.

CITATION LIST

Patent Literature (PTL 1)
Japanese unexamined Patent Application, Publication No. 2003-166659

SUMMARY OF INVENTION

Technical Problem

As described above, in the relief valve disclosed in PTL 1, the fluid flows into the valve chamber side a secondary side) through the valve hole when the fluid pressure on the inflow channel side (the primary side) reaches the given pressure or more.

However, when the valve element moves away from the valve hole, a large amount of fluid flows into the valve chamber from the valve hole. The fluid pressure of the fluid on the inflow channel side (the primary side) thereby rapidly drops, so that the fluid pressure of the fluid on the valve chamber side (the secondary side) increases. In this case, the force in a direction to bring the valve element away from the valve hole is weakened, and the valve element moves in the direction to come into contact with the valve hole. When the valve element moves in the direction to come into contact with the valve hole, the inflow rate of the fluid from the valve hole to the valve chamber decreases, or the fluid stops flowing into the valve chamber. The fluid pressure of the fluid on the inflow channel side (the primary side) thereby increases again.

As described above, if the large amount of fluid flows into the valve chamber from the valve hole when the valve element moves away from the valve hole, an oscillation phenomenon may occur in which the valve element repetitively moves in the direction to move away from the valve hole and in the direction to come into contact with the valve hole. When the oscillation phenomenon occurs, the relief valve operates unstably, and the relief valve is also deteriorated due to repetitive contacts between the valve element and the valve hole.

As disclosed herein, a relief valve which can suppress the occurrence of the oscillation phenomenon in a valve element when the valve element moves away from a valve hole is provided.

Solution to Problem

To achieve the above object, the present disclosure employs the following solutions.

A relief valve according to the present disclosure includes: a valve element; a body portion in which a valve chamber chat accommodates the valve element is formed; an inflow channel that guides a fluid flowing in from an upstream side to the valve chamber; a valve hole that allows the valve element to be inserted therein, and shuts off passage of the fluid between the valve hole and the valve chamber by contacting the valve element; an outflow channel that guides the fluid flowing into the valve hole from the valve chamber to a downstream side; and a spring that applies an urging force in a direction to bring the valve element into contact with the valve hole to the valve element, wherein an annular convex portion having an annular shape in plan view that is convexed in a direction in which the valve element moves away from the valve hole along a center axis of the valve hole and that is arranged around the valve hole is formed in the valve chamber, an annular concave portion having an annular shape in plan view that is concaved in the direction in which the valve element moves away from the valve hole along the center axis of the valve hole is formed in the valve element, and in a shut-off state in which the valve element is in contact with the valve hole, the annular convex portion is accommodated in the annular concave portion, and an annular channel having an annular shape in plan view that extends in a direction of the center axis is formed between an outer peripheral surface of the annular convex portion and an inner peripheral surface of the annular concave portion.

In accordance with the relief valve of the present disclosure, the fluid flowing in from the upstream side is guided to the valve chamber from the inflow channel, which are a primary side. Since the urging force in the direction to bring the valve element into contact with the valve hole is applied to the valve element accommodated in the valve chamber from the spring, the shut-off state in which the valve element is in contact with the valve hole is obtained when the fluid pressure on the primary side is low. When the fluid pressure on the primary side reaches a given pressure or more, a force overcoming the urging force from the spring is applied to the valve element. The valve element thereby moves away from the valve hole, and the fluid within the valve chamber flows into the outflow channel, which is a secondary side, through the valve hole.

When the valve element moves away from the valve hole, the fluid within the valve chamber passes through the annular channel formed between the outer peripheral surface of the annular convex portion and the inner peripheral surface of the annular concave portion. Since the annular channel extends in the direction of the center axis, the sectional area of the annular channel is not changed even when the valve element moves along the center axis when the valve element moves away from the valve hole. Therefore, the flow rate of the fluid flowing into the valve hole from the valve chamber when the valve element moves away from the valve hole is regulated by the annular channel. The large amount of fluid is thereby prevented from flowing into the valve hole from the valve chamber.

Accordingly, the occurrence of an oscillation phenomenon caused in the valve element by the large amount of fluid flowing into the valve hole from the valve chamber when the valve element moves away from the valve hole can be suppressed.

The relief valve according to a first aspect of the present disclosure may further include: a connecting portion, one end of which along the center axis is connected to the valve element, and at the other end of which a groove portion where the spring is inserted is formed; a support portion that supports one end of the spring, the other end of which, is inserted into the groove portion of the connecting portion; and an adjusting mechanism that adjusts a position of the support portion in the direction of the center axis.

Accordingly, the urging force applied to the valve element from the spring can be appropriately adjusted by adjusting the position of the support portion in the direction of the center axis by the adjusting mechanism.

The relief valve according to the first aspect of the present disclosure may further include: a nut portion that is fixed to the body portion, and an inner diameter of which is substantially equal to an outer diameter of the connecting portion around the center axis; and an O-ring that is arranged in a peripheral groove formed in an outer peripheral surface of the connecting portion, wherein the O-ring and an inner peripheral surface of the nut portion are in contact with each other. In accordance with the configuration, the O-ring that is arranged in the peripheral groove formed in the outer peripheral surface of the connecting portion connected to the valve element is in contact with the inner peripheral surface of the nut portion fixed to the body portion when the valve element moves away from the valve hole.

Accordingly, the moving speed of the valve element when the valve element moves away from the valve hole is restricted. The occurrence of the oscillation phenomenon caused in the valve element by the large amount of fluid flowing into the valve hole from the valve chamber can be thereby further suppressed.

According to some embodiments of the disclosure set forth therein, can provide the relief valve which can suppress the occurrence of the oscillation phenomenon in the valve element when the valve element moves away from the valve hole.

BRIEF DESCRIPTION OF DRAWINGS

FIG. 4A shows a region around a valve hole of the relief valve in a shut-off state shown, in FIG. 1; FIG. 4B shows the region around the valve hole of the relief valve in an open state shown in FIG. 2; and FIG. 4C shows the region around the valve hole of the relief valve in a fully-open state shown in FIG. 3.

DESCRIPTION OF EMBODIMENTS

Figure 1:
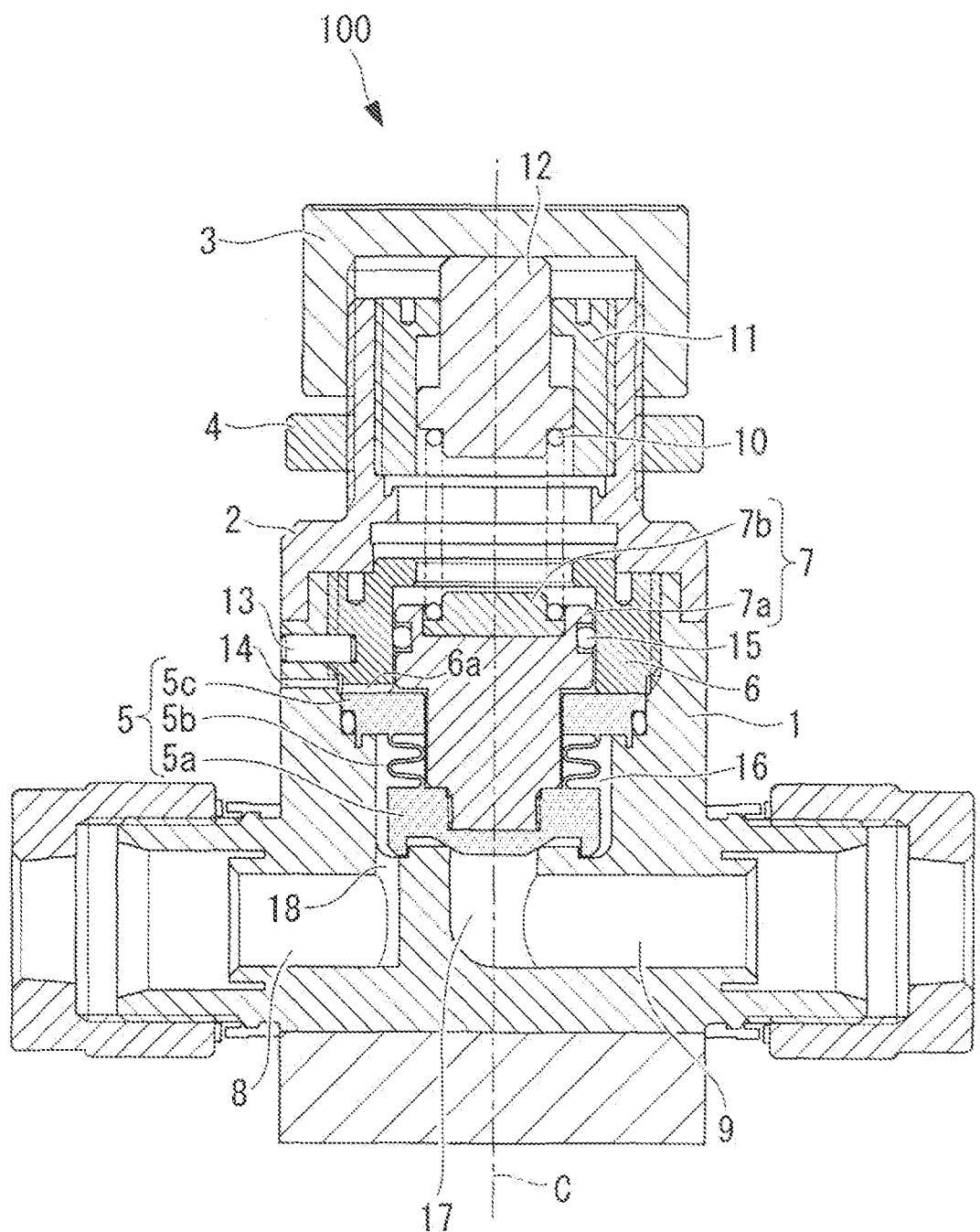
FIG. 1 is a longitudinal sectional view illustrating a relief valve according to one embodiment.
Figure 2:
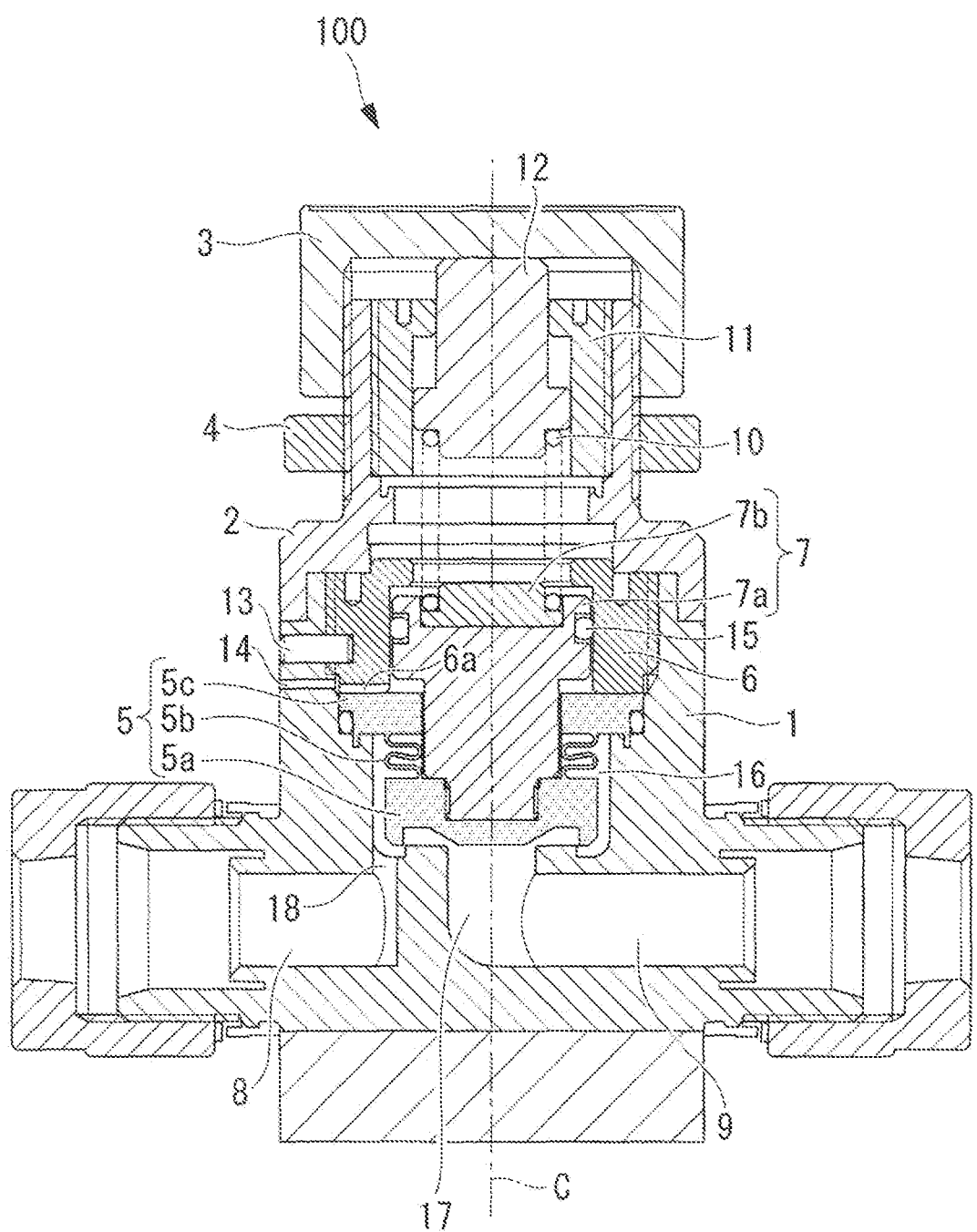
FIG. 2 is a longitudinal sectional view illustrating the relief valve according to one embodiment.
Figure 3:
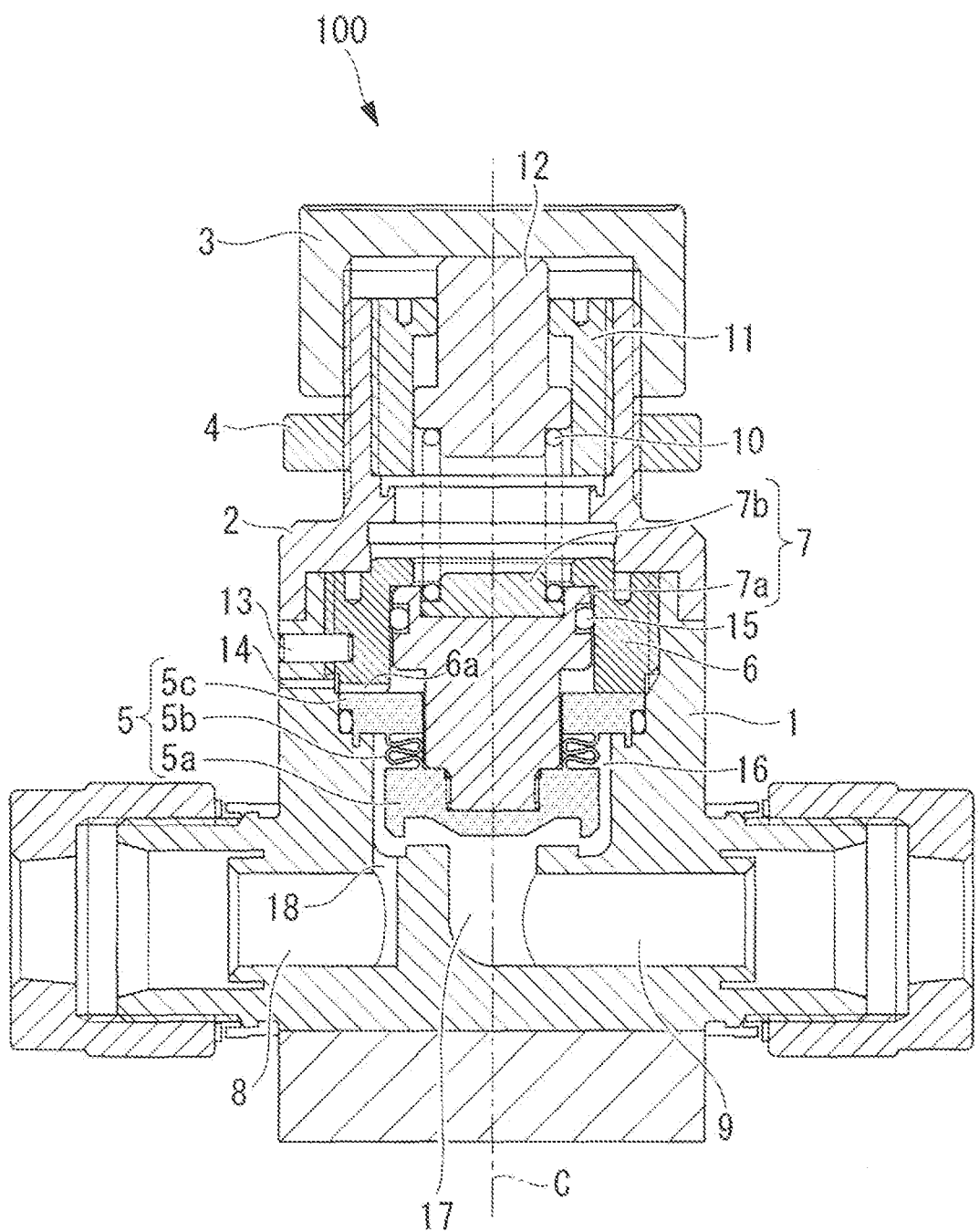
FIG. 3 is a longitudinal sectional view illustrating the relief valve according to one embodiment.

In the following, a relief valve 100 according to one embodiment of the present disclosure is described based on the drawings. FIG. 1 is a longitudinal sectional view illustrating the relief valve 100 according to one embodiment of the present disclosure. FIG. 1 shows the relief valve 100 in a shut-off state. FIG. 2 is a longitudinal sectional view illustrating the relief valve 100 according to one embodiment of the present disclosure. FIG. 2 shows the relief valve 100 in an open state. FIG. 3 is a longitudinal sectional view illustrating the relief valve 100 according to one embodiment of the present disclosure. FIG. 3 shows the relief valve 100 in a fully-open state.

The relief valve 100 shown in FIG. 1 is a device that is installed in a pipe channel for fluids (chemicals, pure water or the like) for use in a semiconductor manufacturing apparatus or the like. When the fluid pressure of a fluid flowing in front an upstream-side pipe (not shown) reaches a given pressure or more, the relief valve 100 comes into an open state to pass the fluid to a downstream-side pipe (not shown).

A body 1 (a body portion) is a member constituting a casing portion of the relief valve 100. A valve chamber 16 that accommodates a valve element 5a of a diaphragm valve 5 is formed within the body 1. The relief valve 100 includes an inflow channel 8 that guides the fluid flowing in from the upstream-side pipe to the valve chamber 16, and an outflow channel 9 that guides the fluid flowing into a valve hole 17 from the valve chamber 16 to the downstream-side pipe (not shown). The fluid flowing into the inflow channel 8 from the upstream-side pipe flows into the valve chamber 16 through an opening portion 18 that opens in the valve chamber 16.

The valve hole 17 is formed inside the body 1 such that the valve element 5a of the diaphragm valve 5 can be inserted into the valve hole 17. The valve hole 17 extends along a center axis C, and has a substantially circular shape in sectional view. A distal end portion of one valve element 5a comes into contact with the body 1 that forms the valve hole 17 to thereby shut off passage of the fluid between the valve hole 17 and the valve chamber 16.

A diaphragm bellows 5b is provided in the diaphragm valve 5. The diaphragm bellows 5b separates a channel for the fluid from another portion. The diaphragm bellows 5b is a tubular thin film member, which is deformed along with the movement of the valve element 5a in the direction of the center axis C.

The diaphragm valve 5 includes an annular end portion 5c that is connected to the diaphragm bellows 5b. The annular end portion 5c is a member having an annular shape in plan view along the center axis C. A projecting portion that extends in a circumferential direction is provided under an outer peripheral side edge portion of the annular end portion 5c. The projecting portion is inserted into a groove portion provided in the body 1 and having an annular shape in plan view along the center axis C. An upper surface of the outer peripheral side edge portion of the annular end portion 5c is in contact with a support nut 6 (a nut portion). By pressing the upper surface of the outer peripheral side edge portion of the annular end portion 5c by the support nut 6, the annular end portion 5c is fixed to the body 1. The support nut 6 is preferably made of a resin material (e.g., PFA, PCTFE having excellent temperature characteristics and mechanical characteristics.

A male threaded portion is formed on an outer peripheral surface of the support nut 6. The male threaded portion of the support nut 6 is screwed to a female threaded portion formed on an inner peripheral surface of the body 1. A flat-bottomed hole is formed in the outer peripheral surface of the support nut 6. A fixing pin 13 is inserted into the flat-bottomed hole through a through hole formed in the body 1. Rotation of the support nut 6 around the center axis C is thereby restricted. Since the support nut 6 is fixed, by the fixing pin 13, the rotation of the support nut 6 around the center axis C can be restricted even when the resin material forming the support nut 6 and the body 1 expands or contracts due to the influences of the temperature of the fluid or the like.

A groove portion 6a extending in a direction perpendicular to the center axis C is provided in a surface of the support nut 6 in contact with the annular end portion 5c. The groove portion 6a and a discharge hole 14 formed in the body 1 are arranged communicating with each other. A channel including the groove portion 6a and the discharge hole 14 is a channel for discharging a corrosive gas generated within the relief valve 100 to the outside. The corrosive gas is generated when the chemicals, such as hydrofluoric acid and nitric acid, partially permeate the diaphragm bellows 5b of the diaphragm valve 5. By discharging the corrosive gas to the outside of the relief valve 100, the corrosive gas is prevented from flowing into an upper portion of the relief valve 100.

A concave portion that is concaved on the upper side around the center axis C is provided in the valve element 5a. A female threaded portion is formed on an inner peripheral surface of the concave portion. A male threaded portion formed on a distal end of a connecting portion body 7a of a connecting portion 7 is screwed to the female threaded portion formed on the valve element 5a. A spring support portion 7b is fixed to an upper portion of the connecting portion body 7a. An end portion of a spring 10 is inserted into a groove portion formed, between the spring support portion 7b and the connecting portion body 7a. As described above, one end of the connecting portion 7 along the center axis C is connected to the valve element 5a, and the groove portion, into which the spring 10 is inserted, is formed at the other end of the connecting portion 7.

The connecting portion body 7a is a shaft-like member that is arranged coaxially with the center axis C. The shaft diameter of the connecting portion body 7a at the position of the annular end portion 5c along the center axis C is substantially equal to the inner diameter of the annular end portion 5c. Here, "substantially equal" means that the shaft diameter of the connecting portion body 7a is slightly smaller than the inner diameter of the annular end portion 5c such that the connecting portion body 7a is movable along the center axis C.

The shaft diameter of the connecting portion body 7a at the position of the support nut 6 along the center axis C is substantially equal to the inner diameter of the support nut 6. Here, "substantially equal" means that the shaft diameter of the connecting portion body 7a is slightly smaller than the inner diameter of the support nut 6 such that the connecting portion body 7a is movable along the center axis C.

As described above, the connecting portion 7 is a member having a stepped shape in which a distal end portion close to the valve hole 17 along the center axis C has a small shaft diameter, and a proximal end portion close to the spring 10 along the center axis C has a large shaft diameter. By employing the member having a stepped shape as the connecting portion 7, the diaphragm valve 5 can be reduced in size, and a stable urging force can be applied to the diaphragm valve 5 from the spring 10 having a large shaft diameter.

A peripheral groove is formed in an outer peripheral surface of the connecting portion 7, and an O-ring 15 is arranged in the peripheral groove. The O-ring 15 is arranged in contact with an inner peripheral surface of the support nut 6. Therefore, when the valve element 5a and the connecting portion 7 move along the center axis C, the O-ring 15 is in contact with the inner peripheral surface of the support nut 6.

The support nut 6 includes a step portion projecting toward the center axis C at a proximal end portion close to the spring 10 along the center axis C. After the relief valve 100 comes into a fully-open state, the connecting portion 7 further moves toward the spring 10 along the center axis C. The connecting portion body 7a thereby comes into contact with the step portion. As described above, the step portion works as a stopper for restricting the movement of the connecting portion 7 toward the spring 10 along the center axis C.

A cover portion 2 is connected to the upper portion of the body 1. Four through holes (not shown) are provided in the cover portion 2. The positions of the four through holes respectively correspond to the positions of four threaded holes 20, 21, 22, and 23 shown in FIG. 5 as described below. By respectively inserting fastening screws into the four through holes, and screwing the screws to female threaded portions formed on inner peripheral surfaces of the four threaded holes 20, 21, 22, and 23, the cover portion 2 is connected to the body 1.

The cover portion 2 is a cylindrical member that is arranged coaxially with the center axis C. A female threaded portion is formed on an inner peripheral surface of a distal end portion (an end portion in a direction away from the valve hole 17) of the cover portion 2, and a male threaded portion is formed on an outer peripheral surface thereof. A holding member 11 is screwed to the female threaded portion formed on the inner peripheral surface of the cover portion 2. A grip portion 3 and a lock nut 4 are screwed to the male threaded portion formed on the outer peripheral surface of the cover portion 2.

A spring support portion 12 that is arranged so as to contact an inner peripheral surface of the holding member 11 is arranged inside the holding member 11. The spring support portion 12 is a member that supports one end of the spring 10, the other end of which is inserted into the groove portion of the connecting portion 7. An urging force in a direction to bring the spring support portion 12 away from the valve hole 17 along the center axis C is applied to the spring support portion 12 from the spring 10. The spring support portion 12, which is given the urging force from the spring 10 at one end portion, is abutted against a lower surface of the grip portion 3 at the other end portion thereof.

A female threaded portion formed on an inner peripheral surface of the grip portion 3 is screwed to the male threaded portion formed on the outer peripheral surface of the cover portion 2. Therefore, by rotating the grip portion 3 around the center axis C, the position of the grip portion 3 in the direction of the center axis C is adjusted with respect to the cover portion 2. The position of the spring support portion 12 is determined by the position of the grip portion 3. The urging force applied to the valve element 5a from the spring 10 via the connecting portion 7 is thereby determined. By adjusting the position of the grip portion 3 in the direction of the center axis C as described above, the urging force in a direction to bring the valve element 5a into contact with the valve hole 17 is adjusted.

The lock nut 4 is a member that restricts the rotation of the grip portion 3 around the center axis C, and fixes the position of the grip portion 3 along the center axis C. By rotating the lock nut 4 around the center axis C, and thereby bringing an upper surface of the lock nut 4 into contact with the lower surface of one grip portion 3, the position of the grip portion 3 along the center axis C is fixed. Accordingly, the cover portion 2, the grip portion 3f and the lock nut 4 constitute an adjusting mechanism that adjusts the position of the spring support portion 12 in the direction of the center axis C.

Figure 4:
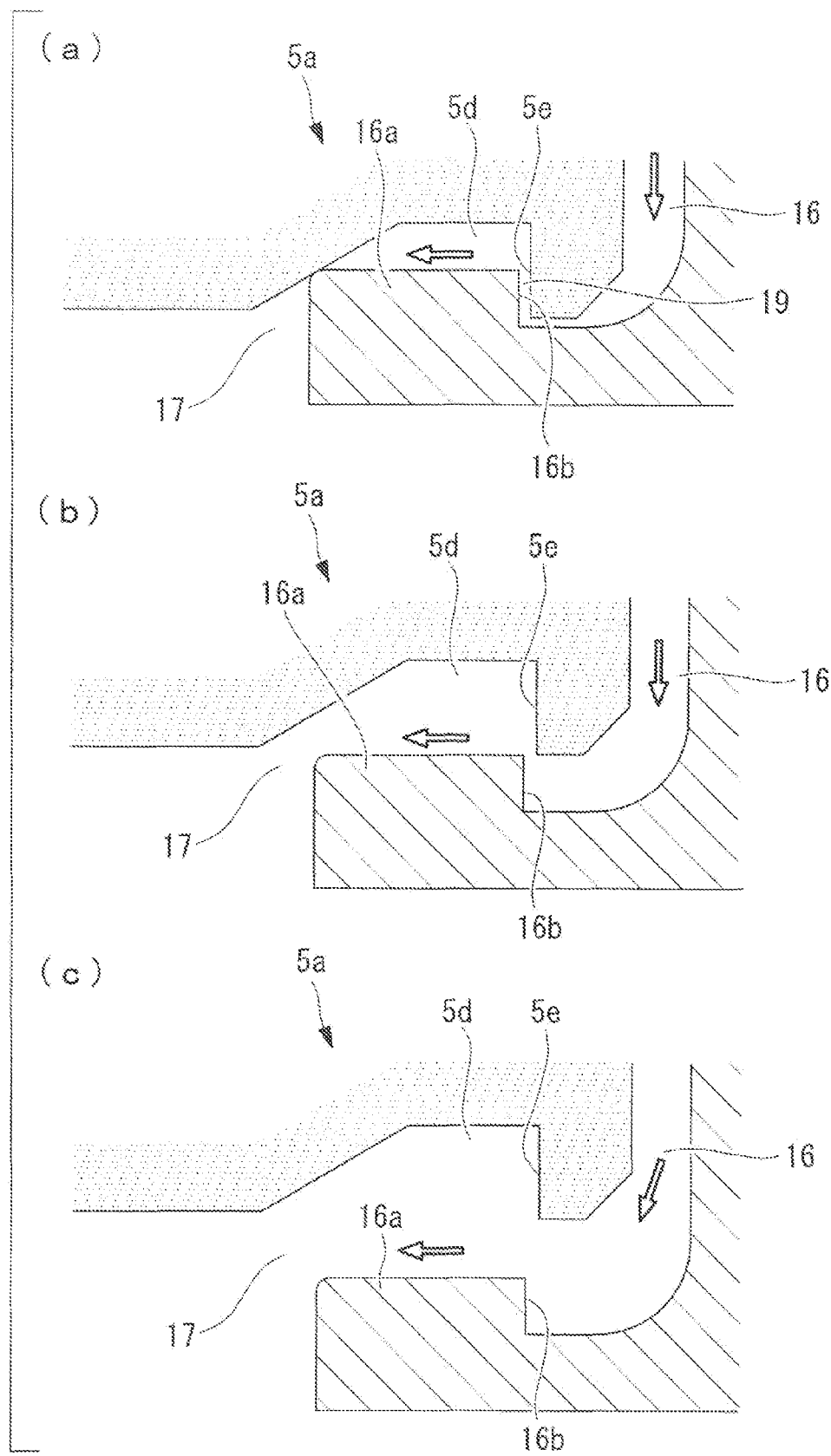
FIG. 4 are main portion enlarged views of the relief valve.

Next, the operation of the relief valve 100 when the relief valve 100 is shifted from a shut-off state (a fully-closed state) to a fully-open state is described by using FIGS. 4. FIGS. 4 are main portion enlarged views of the relief valve 100. FIG. 4A shows a region around the valve hole 17 of the relief valve 100 in a shut-off state shown in FIG. 1. FIG. 4B shows the region around the valve hole 17 of the relief valve 100 in an open state shown in FIG. 2. FIG. 4C shows the region around the valve hole 17 of the relief valve 100 in a fully-open state shown in FIG. 3. Arrows in FIGS. 4 indicate the flow of the fluid flowing into the valve hole 17 from the valve chamber 16 when the valve element 5a moves away from the valve hole 17.

An annular convex portion 16a is arranged in a portion around the valve hole 17 within the valve chamber 16 as shown in FIGS. 4. The annular convex portion 16a is convexed in a direction in which the valve element 5a moves away from the valve hole 17 along the center axis C of the valve hole 17. The annular convex portion 16a has an annular shape in plan view as viewed in the direction of the center axis C. An annular concave portion 5d that is concaved in the direction in which the valve element 5a moves away from the valve hole 17 along the center axis C of one valve hole 17 is arranged in the valve element 5a shown in FIGS. 4. The annular concave portion 5d has an annular shape in plan view as viewed in the direction of the center axis C.

In the relief valve 100 in the shut-off state shown in FIG. 4A, the fluid flowing in through the inflow channel 8 is accumulated in the valve chamber 16. In the relief valve 100 in the shut-off state, the annular convex portion 16a is accommodated in the annular concave portion 5d. In the relief valve 100 in the shut-off state, an annular channel 19 that extends in the direction of the center axis C is also formed between an outer peripheral surface 16b of the annular convex portion 16a and an inner peripheral surface 5e of the annular concave portion 5d. The annular channel 19 is a channel having an annular shape in plan view as viewed in the direction of the center axis C.

In the relief valve 100 in the shut-off state, the valve element 5a and the valve hole 17 are in contact with each other as shown in FIG. 4A, so that the fluid does not flow into the valve hole 17 from the valve chamber 16. "The shut-off state in which the valve element 5a and the valve hole 17 are in contact with each other" means a state in which an inner peripheral end portion of the annular convex portion 16a of the body 1 forming the valve hole 17 is in contact with the valve element 5a.

In the relief valve 100 in the shut-off state shown in FIG. 4A, when the fluid pressure of the fluid in the valve chamber 16, which is a primary side, increases, a force applied no the valve element 5a from the fluid pressure of the fluid flowing in between the annular convex portion 16a and the annular concave portion 5d through the annular channel 19 gradually becomes higher. When the fluid pressure on the primary side reaches a given pressure or more, a force overcoming the urging force from the spring 10 is applied to the valve element 5a. The valve element 5a thereby moves away from one valve hole 17 to cause the fluid within the valve chamber 16 to flow into the outflow channel 9, which is a secondary side, through the valve hole 17.

When the valve element 5a moves away from the valve hole 17, the fluid within the valve chamber 16 passes through the annular channel 19 formed between the outer peripheral surface 16b of the annular convex portion 16a and the inner peripheral surface 5e of the annular concave portion 5d. The annular channel 19 extends in the direction of the center axis C. Therefore, the sectional area of the annular channel 19 is not changed even when the valve element 5a moves along the center axis C when the valve element 5a moves away from the valve hole. Accordingly, the flow rate of the fluid flowing into the valve hole 17 from the valve chamber 16 when the valve element 5a moves away from the valve hole 17 is regulated by the annular channel 19. The large amount of fluid is thereby prevented from flowing into the valve hole 17 from the valve chamber 16 when the valve element 5a moves away from the valve hole 17.

A distance between the outer peripheral surface 16b of the annular convex portion 16a and the inner peripheral surface 5e of the annular concave portion 5d in the relief valve 100 in the shut-off state may be appropriately set according to the fluid pressure in the valve chamber 16 (the primary side) when the relief valve 100 is in the open state, the type of the fluid, the channel diameter of the outflow channel 9 or the like. Similarly, the length of the annular channel 19 in the direction of the center axis C in the relief valve 100 in the shut-off state may be appropriately set according to the fluid pressure in the valve chamber 16 (the primary side) when the relief valve 100 is in the open state, the type of the fluid, the channel diameter of the outflow channel 9 or the like.

When the valve element 5a moves away from the valve hole 17, and the fluid pressure of the fluid within the valve chamber 16 is further raised, the relief valve 100 comes into the open state as shown in FIG. 4B. In the open state shown in FIG. 4B, the annular convex portion 16a is separate from the annular concave portion 5d, and the annular convex portion 16a is thus not accommodated in the annular concave portion 5d. Therefore, the annular channel 19 is not formed in the open stats shown in FIG. 4B.

When the fluid pressure of the fluid within the valve chamber 16 is further raised from the state shown in FIG. 4B, the relief valve 100 comes into the fully-open state as shown in. FIG. 4C. When the relief valve 100 comes into the fully-open state, an upper surface of the connecting portion body 7a comes into contact with the support nut 6 as shown in FIG. 3. With the connecting portion body 7a contacting the support nut 6, the valve element 5a is restricted from moving further upward.

Figure 5:
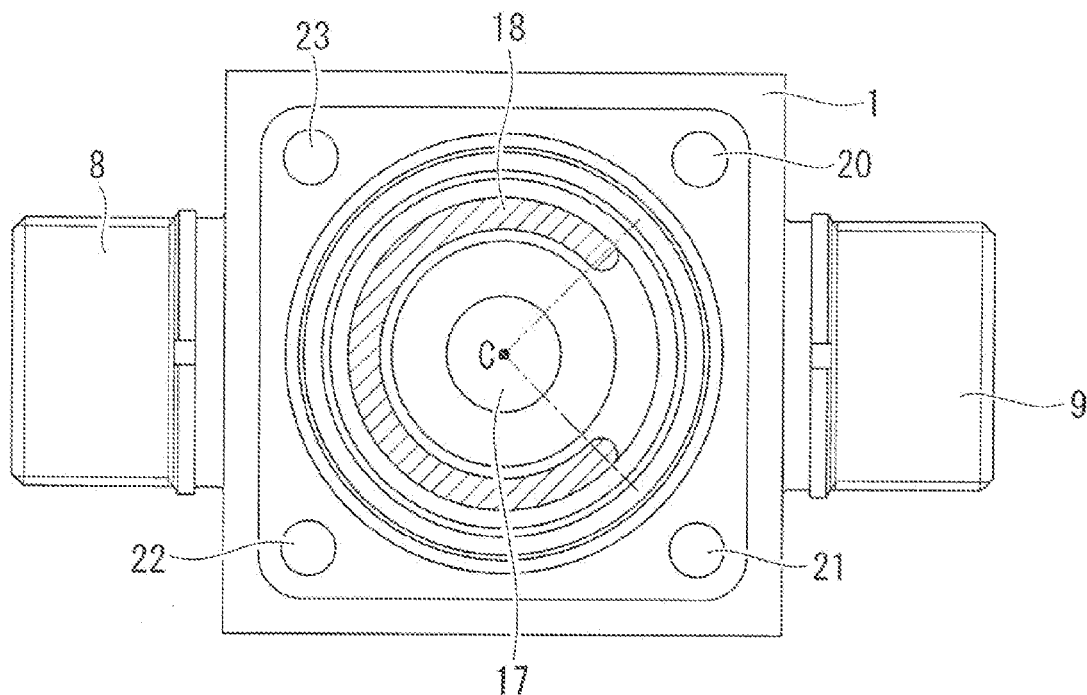
FIG. 5 is a plan view of a body of the relief valve according to one embodiment.

FIG. 5 is a plan view of the body 1 of the relief valve 100 according to one embodiment of the present disclosure. The opening portion 18 shown in FIG. 5 is an inlet for the fluid from the inflow channel 8 to the valve chamber 16. As shown in FIG. 5, the opening portion 18 is provided over the range of approximately 270° about the center axis C centering on the inflow channel 8. By providing the opening portion 18 in an extensive region, a trouble in which, for example, the fluid flowing into the valve chamber 16 from the inflow channel 8 forms a swirling flow within the valve chamber 16 can be suppressed.

As described above, in accordance with the relief valve 100 of the present embodiment, the fluid flowing in from the upstream side is guided to the valve chamber 16 from the inflow channel 8, which are the primary side. Since the urging force in the direction to bring the valve element 5a into contact with the valve hole 17 is applied to the valve element 5a accommodated in the valve chamber 16 from the spring 10, the shut-off state in which the valve element 5a is in contact with the valve hole 17 is obtained when the fluid pressure on the primary side is low. when the fluid pressure on the primary side reaches a given pressure or more, the force overcoming the urging force from the spring 10 is applied to the valve element 5a. The valve element 5a thereby moves away from the valve hole 17, and the fluid within the valve chamber 16 flows into the outflow channel 9, which is the secondary side, through, the valve hole 17.

When the valve element 5a moves away from the valve hole 17, the fluid within the valve chamber 16 passes through the annular channel 19 formed between the outer peripheral surface 16b of the annular convex portion 16a and the inner peripheral surface 5e of the annular concave portion 5d. Since the annular channel 19 extends in the direction of the center axis C, the sectional area of the annular channel 19 is not changed even when the valve element 5a moves along the center axis C when the valve element 5a moves away from the valve hole 17. Therefore, the flow rate of the fluid flowing into the valve hole 17 from the valve chamber 16 when the valve element 5a moves away from the valve hole 17 is regulated by the annular channel 19. The large amount of fluid is thereby prevented from flowing into the valve hole 17 from the valve chamber 16.

Accordingly, the occurrence of an oscillation phenomenon caused in the valve element 5a by the large amount of fluid flowing into the valve hole 17 from the valve chamber 16 when the valve element 5a moves away from the valve hole 17 can be suppressed.

In a relief valve disclosed in PTL 1 Japanese Unexamined Patent Application, Publication No. 2003-166659), a fluid flows into a valve chamber side (a secondary side; from an inflow channel side (a primary side) through a valve hole. Since the valve hole has a sufficiently smaller diameter than the diameter of the valve chamber, a pressure-receiving area of a valve element for receiving the pressure of the fluid on the primary side is small when the relief valve is in a closed state. Therefore, when the relief valve is changed to an open state from the closed state, a trouble easily occurs in which the valve element tends to be affected by the pressure of the fluid on the secondary side, and the oscillation phenomenon is thereby caused.

On the other hand, in the relief valve 100 of the present embodiment, the fluid flows out to the outflow channel 9 (the secondary side) from the valve chamber 16 (the primary side) through the valve hole 17. The valve chamber 16 has a sufficiently larger diameter than the diameter of the valve hole 17. Thus, by forming the shape of the valve element 5a as in the present embodiment, a pressure-receiving area of the valve element 5a for receiving the pressure of the fluid on the primary side when the relief valve 100 is in the closed state can be made larger. Therefore, when the relief valve 100 is changed to the open state from the closed state, a trouble is difficult to occur in which the valve element 5a is affected by the pressure of the fluid on the secondary side, and the oscillation phenomenon is caused.

The relief valve 100 of the present embodiment includes the adjusting mechanism (the cover portion 2, the grip portion 3, and the lock nut 4) that adjusts the position of the spring support portion 12 in the direction of the center axis C. Accordingly, the urging force applied to the valve element 5a from the spring 10 can be appropriately adjusted by adjusting the position of the spring support portion 12 in the direction of the center axis C by the adjusting mechanism.

In the relief valve 100 of the present embodiment, the O-ring 15 that is arranged in the peripheral groove formed in the outer peripheral surface of the connecting portion 7 connected to the valve element 5a is in contact with the inner peripheral surface of the support nut 6 fixed to the body 1 when the valve element 5a moves away from the valve hole 17. Accordingly, the moving speed of the valve element 5a when the valve element 5a moves away from the valve hole 17 is restricted. The occurrence of the oscillation phenomenon caused in the valve element 5a by the large amount of fluid flowing into the valve hole 17 from the valve chamber 15 can be thereby further suppressed.

Another Embodiment

Figure 6:
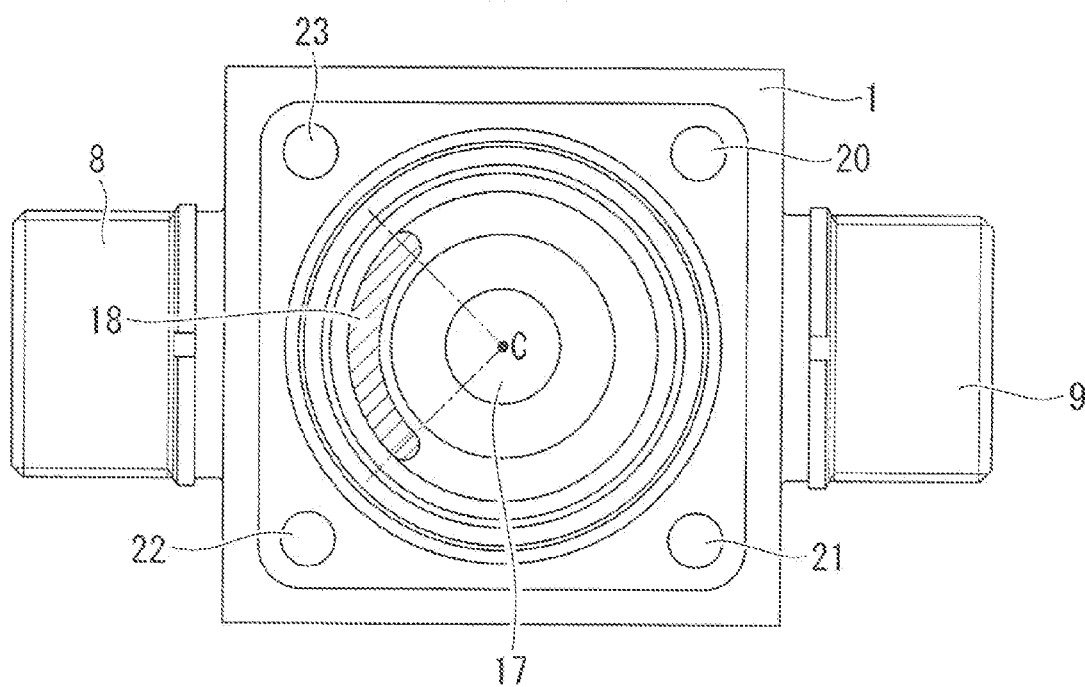
FIG. 6 is a plan view of a body of a relief valve according to another embodiment.

In the above description, the opening portion 18 is provided over the range of approximately 270° about the center axis C centering on the inflow channel 8 as shown in FIG. 5. However, another aspect may be also employed. For example, the opening portion 18 may be also provided over the range of approximately 90° about the center axis C centering on the inflow channel 8 as shown in FIG. 6.

The present invention is not limited to the above embodiments, and may be changed as appropriate without departing from the scope of the present invention.

The invention claimed is:
1. A relief valve comprising:
a valve element;
a body portion in which a valve chamber that accommodates the valve element is formed;
an inflow channel that guides a fluid flowing in from an upstream side to the valve chamber;
a valve hole that allows the valve element to be inserted therein, and shuts off passage of the fluid between the valve hole and the valve chamber by contacting the valve element;
an outflow channel that guides the fluid flowing into the valve hole from the valve chamber to a downstream side; and
a spring that applies an urging force in a direction to bring the valve element into contact with the valve hole to the valve element,
wherein an annular convex portion having an annular shape in plan view that is convexed in a direction in which the valve element moves away from the valve hole along a center axis of the valve hole and that is arranged around the valve hole is formed in the valve chamber,
an annular concave portion having an annular shape in plan view that is concaved in the direction in which the valve element moves away from the valve hole along the center axis of the valve hole is formed in the valve element,
in a shut-off state in which the valve element is in contact with the valve hole, the annular convex portion is accommodated in the annular concave portion, and an annular channel having an annular shape in plan view that extends in a direction of the center axis is formed between an outer peripheral surface of the annular convex portion and an inner peripheral surface of the annular concave portion, a sectional area of the annular channel is not changed irrespective of a position of the valve element ranging from a position in the shut-off state to a position in which the annular convex portion is not accommodated in the annular concave portion when the valve element moves away from the valve hole along the center axis due to the increased fluid pressure of the fluid in the valve chamber, and the flow rate of the fluid flowing into the valve hole from the valve chamber is regulated by the annular channel when the valve element moves away from the valve hole.

2. The relief valve according to claim 1, further comprising:

a connecting portion, one end of which along the center axis is connected to the valve element, and at the other end of which a groove portion where the spring is inserted is formed;

a support portion that supports one end of the spring, the other end of which is inserted into the groove portion of the connecting portion; and an adjusting mechanism that adjusts a position of the support portion in the direction of the center axis.

3. A relief valve comprising:

a valve element;

a body portion in which a valve chamber that accommodates the valve element is formed;

an inflow channel that guides a fluid flowing in from an upstream side to the valve chamber;

a valve hole that allows the valve element to be inserted therein, and shuts off passage of the fluid between the valve hole and the valve chamber by containing the valve element;

an outflow channel that guides the fluid flowing into the valve hole from the valve chamber to a downstream side;

a spring that applies an urging force in a direction to bring the valve element into contact with the valve hole to the valve element;

a connecting portion, one end of which along the center axis is connected to the valve element, and at the other end of which a groove portion where the spring is inserted is formed;

a support portion that supports one end of the spring, the other end of which is inserted into the groove portion of the connecting portion;

an adjusting mechanism that adjusts a portion of the support portion in the direction of the center axis;

a nut portion that is fixed to the body portion, and an inner diameter of which is substantially equal to an outer diameter of the connecting around the center axis; and an O-ring that is arranged in a peripheral groove formed in an outer peripheral surface of the connecting portion, wherein an annular convex portion having an annular shape in plan view that is convexed in a direction in which the valve element moves away from the valve hole along a center axis of the valve hole and that is arranged around the valve hole is formed in the valve chamber;

an annular concave portion having an annular shape in plan view that is concaved in the direction in which the valve element moves away from the valve hole along the center axis of the valve hole is formed in the valve element, in a shut-off state in which the valve element is in contact with the valve hole, the annular convex portion is accommodated in the annular concave portion, and an annular channel having an annular shape in plan view that extends in a direction of the center axis is formed between an outer peripheral surface of the annular convex portion and an inner peripheral surface of the annular concave portion, and the O-ring and an inner peripheral surface of the nut portion are in contact with each other.

\* \* \* \* \*